United States Patent [19]

Massie

[11] Patent Number: 5,465,928
[45] Date of Patent: Nov. 14, 1995

[54] MOUNTING CLIP

[75] Inventor: Joseph E. Massie, Benton Harbor, Mich.

[73] Assignee: E.I. Partners, Eau Claire, Mich.

[21] Appl. No.: 286,659

[22] Filed: Aug. 5, 1994

[51] Int. Cl.⁶ ........................................... G12B 9/00
[52] U.S. Cl. .................. 248/27.1; 248/906; 248/231.31; 362/74
[58] Field of Search ....................... 248/27.1, 906, 248/205, 225.31; 362/74

[56] References Cited

U.S. PATENT DOCUMENTS

| | | |
|---|---|---|
| 83,983 | 11/1868 | Marrin . |
| 1,230,758 | 6/1917 | Murnane . |
| 1,327,011 | 1/1920 | Arndt . |
| 2,264,485 | 3/1939 | Smith ................................. 248/27.1 |
| 2,269,264 | 1/1942 | Haim ..................................... 292/62 |
| 4,146,074 | 3/1979 | Kowalski ........................... 151/41.75 |
| 4,760,500 | 7/1988 | Peng ..................................... 362/74 |
| 4,820,096 | 4/1989 | Knight .................................. 411/169 |

*Primary Examiner*—Leslie A. Braun
*Assistant Examiner*—Gwendolyn Wrenn
*Attorney, Agent, or Firm*—Flynn, Thiel, Boutell & Tanis

[57] ABSTRACT

A combination of an assemblage and at least one mounting clip for mounting the assemblage into an opening of a finite size in a panel having frontwardly facing and rearwardly facing surfaces to facilitate a display of a front face of the assemblage from the frontwardly facing surface of the panel. The mounting clip is secured by a fastener to the assemblage so that the combination of the assemblage and mounting clip are inserted into the opening in the panel as a unit. Thereafter, the fastening mechanism is rotated so as to cause the mounting clip to rotate therewith and place a flange thereon into engagement with the rearwardly facing surface of the panel while the front face of the assemblage engages the frontwardly facing surface of the panel. Continued rotation of the fastening mechanism will effect a drawing of the mounting clip toward the front face of the assemblage so as to clamp the material of the panel between the front face of the assemblage and the flange on the mounting clip.

4 Claims, 1 Drawing Sheet

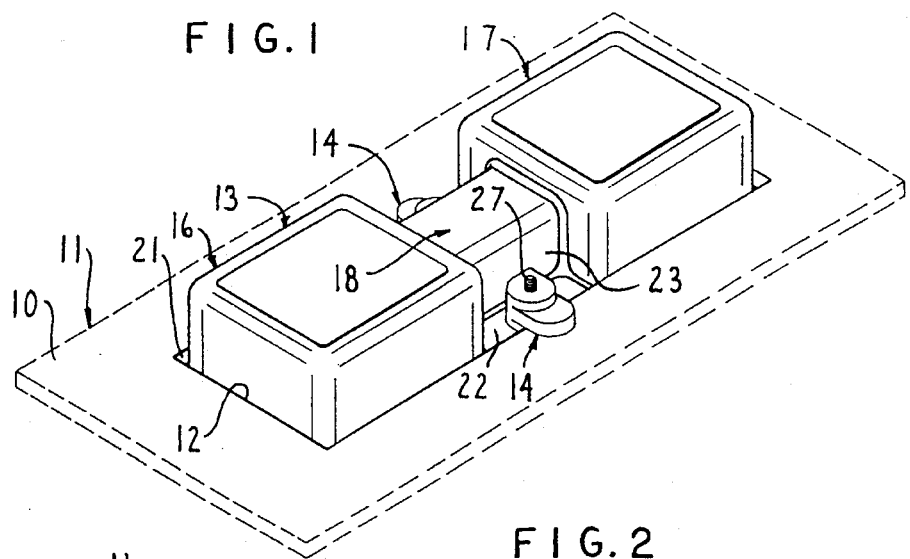
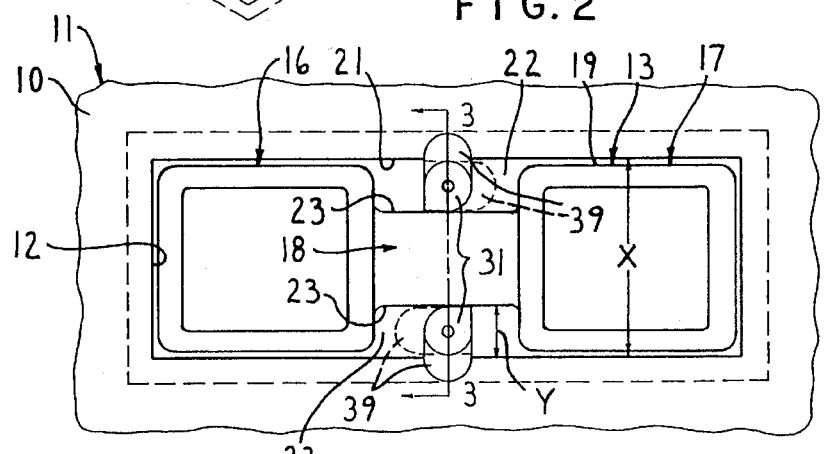
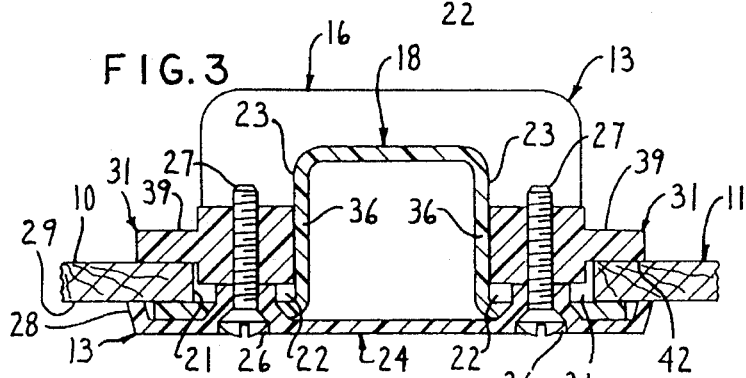
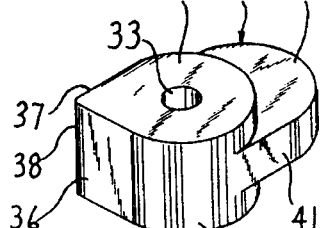
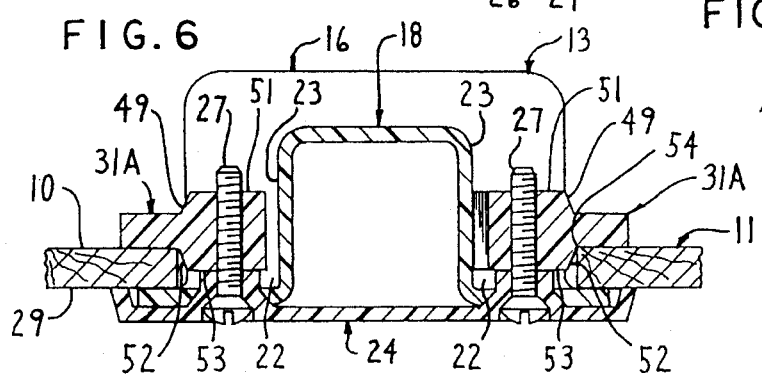
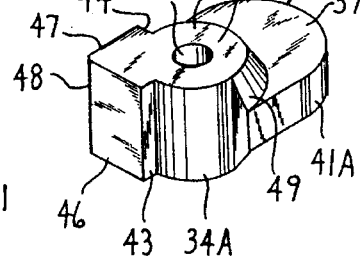

5,465,928

MOUNTING CLIP

FIELD OF THE INVENTION

This invention relates to a combination of an assemblage and a mounting clip for mounting the assemblage into an opening of a finite size in a panel and, more particularly, relates to the mounting of a light fixture onto an interior wall of a vehicle.

BACKGROUND OF THE INVENTION

A requirement for interior lighting in a vehicle is that the lighting be appropriately shielded from the interior wall construction of the vehicle so as to prevent the build up of excessive heat which could possibly generate a fire. Thus, some form of a heat insulating shield is utilized and is placed into an opening in and secured to the interior wall surface of the vehicle by a plurality of screws or other like fasteners. Thereafter, the front face of the light fixture is secured to the shield so as to form an integral lighting fixture. Other installations enable a lighting fixture to be inserted as a unit into the opening in the interior of the vehicle and a plurality of fasteners are utilized to fix the light fixture in place. The fasteners that are typically used are externally threaded screws and the screws are inserted into holes provided in the light fixture and thence are driven into the material of the interior wall of the vehicle to secure the lighting fixture in place. All of this assembly takes time. Time is expense. Accordingly, it is desirous to provide a light fixture that can be assembled into an opening provided in the interior wall of a vehicle with a minimum of fasteners and utilizing a minimum of time.

Accordingly, it is an object of this invention to provide a combination of an assemblage and at least one mounting clip for mounting the assemblage into an opening of a finite size in a panel.

It is a further object of the invention to provide a combination of an interior lighting fixture and at least one mounting clip for mounting the lighting fixture into an opening provided in the interior wall of a vehicle.

It is a further object of the invention to provide a combination, as aforesaid, wherein a pair of mounting clips are utilized, which mounting clips operatively cooperate with conforming structure on the assemblage and the opening in the wall construction so as to facilitate a mounting of the assemblage into the opening without requiring any fastening mechanism to penetrate the material of the wall construction.

It is a further object of the invention to provide a combination, as aforesaid, wherein the assemblage is tightly affixed to the material of the interior wall and will not be permitted to move relative thereto after installation.

It is a further object of the invention to provide a combination, as aforesaid, which is dependable, inexpensive to manufacture and enables an efficient installation of the assemblage into the opening in the wall construction.

SUMMARY OF THE INVENTION

The objects and purposes of the invention have been met by providing a combination of an assemblage and at least one mounting clip for mounting the assemblage into an opening of a finite size in a panel having frontwardly facing and rearwardly facing surfaces to facilitate a display of a front face of the assemblage from the frontwardly facing surface of the panel. The mounting clip is secured by a fastener to the assemblage so that the combination of the assemblage and mounting clip are inserted into the opening in the panel as a unit. Thereafter, the fastening mechanism is rotated so as to cause the mounting clip to rotate therewith and place a flange thereon into engagement with the rearwardly facing surface of the panel while the front face of the assemblage engages the frontwardly facing surface of the panel. Continued rotation of the fastening mechanism will effect a drawing of the mounting clip toward the front face of the assemblage so as to clamp the material of the panel between the front face of the assemblage and the flange on the mounting clip.

BRIEF DESCRIPTION OF THE DRAWINGS

Other objects and purposes of this invention will be apparent to persons acquainted with apparatus of this general type upon reading the following specification and inspecting the drawings accompanying, in which:

FIG. 1 is an isometric view of an assemblage mounted into an opening in a panel as viewed from the rearwardly facing side of the panel;

FIG. 2 is a plan view of the structure illustrated in view FIG. 1;

FIG. 3 is a sectional view taken along the line 3—3 of FIG. 2;

FIG. 4 is a an isometric view of a first embodiment of a mounting clip embodying the invention;

FIG. 5 is a isometric view of a second embodiment of a mounting clip embodying the invention; and FIG. 6 is a sectional view similar to FIG. 3 but utilizing the mounting clip illustrated in FIG. 5.

DETAILED DESCRIPTION

FIG. 1 illustrates in schematic form a fragmentary portion of the rearwardly facing surface 10 of a panel 11 having an opening 12 of a finite size provided therein. In this particular embodiment, the opening 12 is of a rectangular configuration. An assemblage 13 is received in the opening 12 and is secured in place by a pair of mounting clips 14. In this particular embodiment, the assemblage 13 is an interior lighting fixture for the interior of a vehicle and includes a pair of heat shielding housings 16 and 17 for a pair of light bulbs utilized in the lighting fixture, the heat shielding housings 16 and 17 being interconnected by a U-shaped channel member 18 whose width and depth is substantially less than the width and depth of the heat shielding housings 16 and 17.

In FIG. 2, it is noted that the rectangular opening 12 has a width X. The width of the heat shielding housings 16 and 17 is just slightly less than the width of the opening 12 so that a gap 19 exist between the heat shielding housings 16 and 17 and the inwardly facing edge surface 21 of the opening 12. As a result, the width dimensions of the opening 12 do not need to be precise. Since the width dimension of the U-shaped channel 18 interconnecting the heat shielding housings 16 and 17 is substantially less than the width dimension of the heat shielding housings 16 and 17, a pair of cavities 22 are defined between the edge facing surface 21 of the panel 11 and each of the outwardly facing walls 23 of the U-shaped channel 18. Each of the cavities 22 has a width dimension Y. That is, the distance between an edge facing surface 21 and the opposing outwardly facing wall 23 is a dimension Y.

The assemblage 13 also includes a front facing member 24 which usually has an opening provided therein aligned with each of the front facing portions of the heat shielding housings 16 and 17 so as to allow light generated in each of the housings by a light bulb to pass through the openings to light the interior of the vehicle. The front facing member 24 has, in this particular embodiment, a pair of countersunk openings 26 extending therethrough and adapted to receive a screw 27 therein. The axes of the openings 26 are aligned with the cavities 22 and, as a result, the screws 27 extend into the cavities 22. In this particular embodiment, the axes of the openings 26 and screws 27 are oriented approximately in the central portion of the width Y of each of the cavities 22. As is illustrated in FIG. 3, the front facing member 24 includes a peripheral edge 28 that is adapted to engage the frontwardly facing surface 29 of the panel 11.

In this particular embodiment, a mounting clip 31 is utilized for fixedly orienting the assemblage 13 relative to the panel 11. While one such mounting clip 31 would suffice for this purpose, FIGS. 1–3 show a use of two such mounting clips 31. The mounting clip 31 (FIG. 4) includes a generally cylindrical body member 32 having a central hole 33 extending therethrough along the central axis of the cylindrical body member 32. The body member 32 has an outwardly facing cylindrical surface 34. A pair of surfaces 36 and 37 extend in a tangential relation to the cylindrical surface 34 and merged to form a corner 38 spaced radially outwardly from the central axis of the hole 33 a distance further than the distance between the aforesaid central axis of the hole 33 and the cylindrical surface 34. Thus, the flat surface 36 forms a stop, the purpose of which will become apparent below. The mounting clip 31 also includes a radially outwardly extending flange 39 which, in this particular embodiment, extends outwardly from the surface 34 on a side of the central axis of the hole 33 remote from the flat stop surface 36. The diameter of the cylindrical surface 34 is slightly less than the width dimension Y of each of the cavities 22. Since the flange 39 includes edge surfaces 41 that extend tangentially to the surface 34 as illustrated in FIG. 4, the width of the flange 39 is equal to the diameter of the cylindrical surface 34. As a result, the flanges 39 on each of the mounting clips 31 can be oriented in the broken line position illustrated in FIG. 2 to facilitate the assemblage being inserted into the rectangular shaped opening 12 in the panel 11 from the front side 29 of the panel 11. In order to facilitate this insertion, the screws 27 are first inserted into the holes 33 in the mounting clips 31 and the self tapping threads on each of the screws 27 will thread there way through each of the holes 33. During installation, it will be important that the surface 42 on each of the flanges 31 be separated from the peripheral edge 28 of the front facing member 24 a distance greater than the thickness of the material of the panel 11. Once the peripheral edge 28 is in engagement with the frontwardly facing surface 29 of the panel 11, continued rotation of the screws 27 will be permitted so as to cause the mounting clips 31 to rotate from the broken line position illustrated in FIG. 2 to the solid line position thereof placing the flanges 39 in a position overlying the rearwardly facing surface 10 of the panel 11. Continued rotation of the mounting clips 31 with the screws 27 will be prevented when the flat facing stop surface 36 engages the outwardly facing wall surface 23 of the U-shaped channel 18. Thus, continued rotation of the screws 27 will draw the surface 42 on each of the flanges 39 into engagement with the rearwardly facing surface 10 of the panel 11 to draw the peripheral edge 28 of the frontwardly facing member 24 into engagement with the frontwardly facing surface 29 of the panel 11. A tightening of only one or two screws 27 will effect a secure clamping of the panel 11 between the surface 42 on one or two mounting clips 31 and the peripheral edge 28 on the frontwardly facing member 24.

The embodiment of FIGS. 5 and 6 is generally the same as the embodiment of FIGS. 1–4 except that a modified mounting clip 31A is utilized in place of the mounting clip 31. As a result, the same reference numerals utilized above have been incorporated into FIG. 6 except that the modified mounting clip 31 includes some additional features which will be described below. Referring to FIG. 5, the mounting clip 31A includes a cylindrical portion 32A having a centrally located hole 33A extending therethrough and on an axis of the cylindrical portion 32A. The radially outer facing surface 34A of the cylindrical portion 32A includes a pair of arcuately spaced radially outwardly extending surfaces 43 and 44 which extend generally at a right angle to the surface 34A at the point where they merge together. Flat surfaces 46 and 47 extending generally parallel to a tangent to the surface 34A extend, respectively, at a right angle to the surfaces 43 and 44 toward a right angle corner 48. The flat surface 46 forms a stop that functions in a manner identical to the stop surface 36 described above. A flange 39A extends radially outwardly from the cylindrical surface 34A in the same manner as the flange 39. The side edges 41A of the flange 39A extend on a tangent to the cylindrical surface 34A so that the width of the flange 39A is equal to the diameter of the cylindrical surface 34A.

A tapered surface 49 extends between the upper surface of the flange 39A (as illustrated in FIG. 5) and the uppermost surface 51 of the cylindrical portion 32A. Similarly, a tapered surface 52 (FIG. 6) extends between the lower surface of the flange 39A and the lower most surface 53 of the cylindrical portion 32A.

During assembly, the procedure outlined above with respect to the insertion of the assemblage 13 into the opening 12 in the panel 11 can be utilized. Thus, further comment in regard to the assembly is believed unnecessary. However, the stop surface 46 on each of the mounting clips 31A is oriented in a plane spaced radially outwardly to a parallel tangent to the radially outer surface 34A of the cylindrical portion 32A so as to cause the tapered surfaces 49 and 52 to move into engagement with an edge 54 between the edge facing surface 21 and the rearwardly facing surface 10 of the panel 11. Thus, any tendency for the assemblage 13 to move left and right in FIG. 6 relative to the panel 11 will be prevented.

It is to be noted and appreciated that when two mounting clips 31 or 31A are to be utilized as shown in FIGS. 3 and 6, the respective mounting clips are of the same construction. Thus, only one design of the mounting clip needs to be in inventory at the time assembly is to take place.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A combination of an assemblage and at least one mounting clip for mounting said assemblage into an opening of a finite size in a panel having frontwardly facing and rearwardly facing surfaces to facilitate a display of a front face of the assemblage from the frontwardly facing surface of the panel, wherein said assemblage comprises:

a) a first body member having said front face thereon which defines a frontwardly facing display surface having a cross-sectional area adapted to be larger than a cross-sectional area of the opening in the frontwardly facing surface of the panel;

b) a second body member projecting from a side remote from said frontwardly facing display surface, said second body member adapted to have a cross-sectional area less than a cross-sectional area of the opening and at least one region thereon defining a cavity between a side facing wall on said region of a rearwardly projecting part mutually opposing and adapted to be parallel to an edge surface of the opening; and c) means defining a first hole extending through said front face of said first body member, an axis of said first hole being aligned with said side facing wall of said second body member and extending into said cavity;

and wherein said mounting clip comprises:

d) a third body member having a first body part received in said cavity and between said edge surface and said side facing wall and having a peripheral surface extending generally parallel to said edge surface and said side facing wall, means defining a generally arcuate surface extending partially on said peripheral surface, said third body member having a flange extending outwardly from said peripheral surface and adapted to overlie the rearwardly facing surface of the panel, said peripheral surface further having means defining a flat surface extending in a tangentially parallel relation to said arcuate surface outwardly beyond a theoretical continuation of said arcuate surface so as to define a stop adapted to engage at least one of said edge surface and said side facing wall on said region of said second body member;

e) means defining an axially extending through second hole in said first body part, an axis of said second hole being parallel to said arcuate surface and congruent with a centerline for said arcuate surface and axially aligned with said first hole; and f) externally threaded fastener means received in said first and second holes, a frictional resistance between said fastener means and said third body member causing said third body member to rotate about said axes of said first and second holes to bring said flange into a position overlying the rearwardly facing surface and said stop into engagement with at least one of said edge surface and said side facing wall of said second body member so as to prevent continued rotation of said second body member, a continued rotation of said externally threaded fastener means causing a clamping of the panel between a part of said display surface facing said panel and said flange and a fixed holding of the assemblage to the panel.

2. The combination according to claim 1, wherein said second body member includes a pair of spaced rearwardly projecting parts projecting from a side of said first body member remote from said frontwardly facing display surface, a portion of said second body member between said spaced rearwardly projecting parts adapted to be narrower in dimension so as to define said cavity between said side facing wall on said portion and said edge surface of the opening in said panel.

3. The combination according to claim 2, wherein a pair of cavities are provided one on each side of said portion; and wherein a pair of identical mounting clips are provided, one mounting clip in each cavity, said stop on each mounting clip engaging a respective oppositely facing one of said side facing walls on said portion, said first body part occupying said cavity with clearance being provided between said first body part and said edge surface when said stop on each mounting clip engages said side facing walls, said flange on each mounting clip adapted to overlie a respective one of said clearances and said rearwardly facing surface of said panel.

4. The combination according to claim 1, wherein said assemblage is a light fixture for use in an interior of a vehicle.

* * * * *